Sept. 9, 1958  E. J. TAUCH  2,851,336
TWO-STAGE PROCESS FOR SULFAMIC ACID MANUFACTURE
Filed Sept. 26, 1955
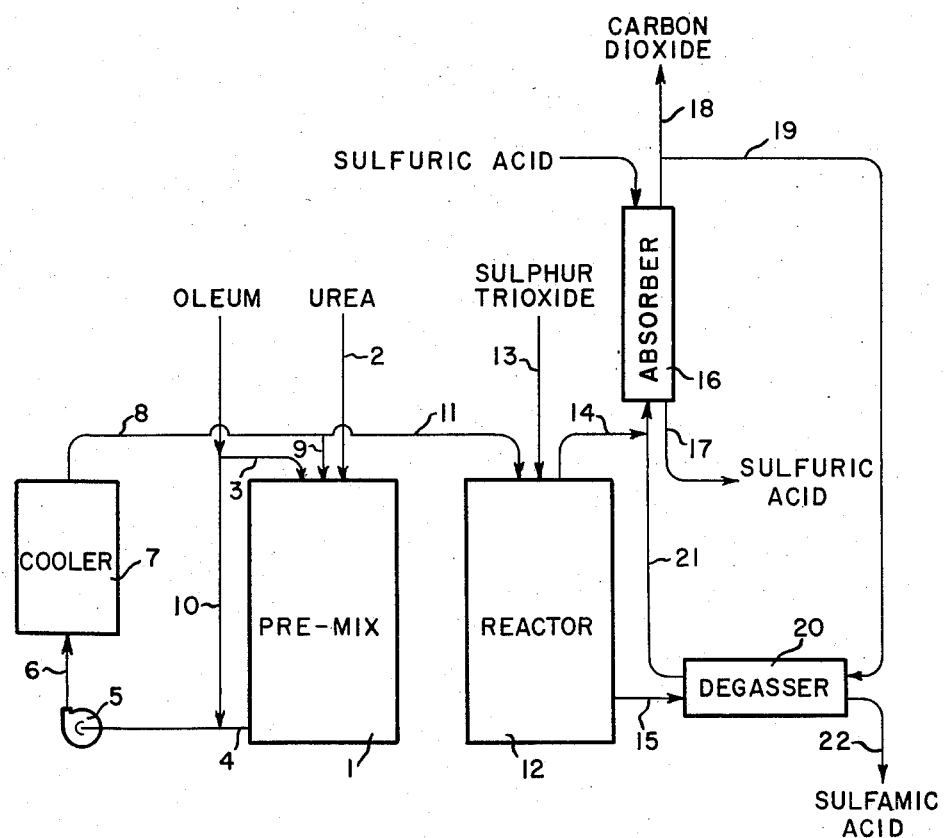
INVENTOR
ERNEST J. TAUCH
BY Ernest H. Beck
ATTORNEY

United States Patent Office 2,851,336
Patented Sept. 9, 1958

2,851,336
TWO-STAGE PROCESS FOR SULFAMIC ACID MANUFACTURE

Ernest J. Tauch, East Cleveland, Ohio, assignor to E. I. du Pont de Nemours and Company, Wilmington, Del., a corporation of Delaware Application September 26, 1955, Serial No. 536,505

3 Claims. (Cl. 23—166)

This invention relates to the manufacture of sulfamic acid. More particularly, it is directed to improved processes in which sulfamic acid is made by the reaction of urea, sulfuric acid and sulfur trioxide in a two stage operation, the first stage being characterized as a cold or liquid stage and the second stage as a hot or solid stage, with sulfur trioxide being introduced in each stage and used in excess, as hereinafter described in detail.

It has heretofore been known that sulfamic acid can be produced from urea, sulfuric acid, and sulfur trioxide with the formation of carbon dioxide as a by-product. The following equation illustrates the overall reaction:

$$CO(NH_2)_2 + H_2SO_4 + SO_3 \rightarrow 2NH_2SO_3H + CO_2$$

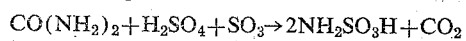

See U. S. Patent 2,102,350. It has also been known that the reactions involved are strongly exothermic and can be violent unless precautions are observed. Accordingly, various techniques have been suggested or used to provide dissipation of the heat of reaction. For example, my U. S. Patent 2,408,492 discloses a method in which the reactants are brought together in the presence of a large amount of a solid diluent, the proportions being such that the reacting mass remains apparently dry and without the presence of any substantially continuous liquid phase. The diluent serves to impose barriers to the self propagation of the reaction, provide greater surface area for the liberation of the gaseous product of the reaction, carbon dioxide, and make possible improved temperature control.

My U. S. Patent 2,408,823 discloses another method in which the urea and sulfuric acid reactants are brought together in a large body of liquid sulfur trioxide which acts as a liquid diluent for the reaction and thus aids in dissipating heat and controlling the reaction.

U. S. Patent 2,390,648 discloses still another method, one in which all the urea, sulfuric acid, and sulfur trioxide to be used in the process are first brought together in a premix reaction with cooling to give as a first step a liquid mass and then this liquid is heated in a second step or phase to form sulfamic acid. U. S. 2,409,572 teaches a modification of this process in which the cooling required in the first stage is obtained by cycling the reacting liquid mass thru an external cooling apparatus.

The present invention is basically a modification and improvement of the two-stage type of process of the aforementioned U. S. Patent 2,390,648. I have found that a safer, more easily controlled, and more economical operation, capable of increased production rates because it makes possible more efficient use of equipment, is obtained in a two-stage process by using a split sulfur trioxide addition method.

More specifically, the processes of this invention are carried out by mixing urea with oleum of strength up to about 51% oleum in proportions sufficient to provide substantially one mol of sulfuric acid for each mol of urea while cooling to suppress the formation of sulfamic acid and form a liquid reacting mass containing a particulate solid reaction product suspended therein; and then in a second stage or step contacting and mixing the liquid reacting mass with an added quantity of sulfur trioxide while raising the temperature and agitating to effect liberation of carbon dioxide and formation of sulfamic acid. In the second step, the sulfur trioxide is added in amount sufficient to provide at least 10% of the total amount of sulfur trioxide introduced into the process and to bring said total amount of sulfur trioxide to at least 30% more than the amount stoichiometrically required to react with urea and sulfuric acid to form sulfamic acid.

Processes of the invention will be better understood by reference to the drawing in which a preferred process is illustrated by means of a modified flowsheet.

Having reference to the drawing, there will be seen a premix vessel 1. The premix vessel has an inlet pipe 2 for the introduction of urea and an inlet pipe 3 for the introduction of oleum. It is also provided with an outlet pipe 4 for withdrawing reacting liquid medium by means of pump 5 and pipeline 6 thru cooler 7 for recycle by means of pipelines 8 and 9 to the premix vessel. A pipe 10 is also shown to permit introduction of a part or all of the oleum just ahead of the intake side of pump 5.

The equipment described above is adapted for carrying out the first step or stage of the two-stage process of the invention. In carrying out the first stage of the processes of the invention, urea and oleum are brought together in proportions to provide substantially one mol of sulfuric acid for each mol of urea. The closer the ratio of sulfuric acid to urea is to exactly mol per mol, the better the quality of the product, other conditions being equal. If an excess of sulfuric acid is used it turns up as impurity in the crude product. If the sulfuric acid is deficient, the product contains unreacted urea or urea decomposition products.

The strength of the oleum reactant introduced in the first stage of the processes of the invention does not exceed about 51% oleum. Preferably, the oleum feed is of a strength in the range of about 45% to 48% oleum altho much lower concentrations, as low as 10% oleum, or even lower, can be used if desired.

As the oleum feed strength is increased above about 48% oleum, the reacting liquid mass in the first stage of the processes becomes increasingly viscous and temperature control is made more difficult. Use of oleum of strength higher than about 51% is impractical in large scale commercial operation in the absence of exceptional cooling and temperature control means because of extreme viscosity of the reacting mass and the dangers of out-of-control and even explosive reaction conditions existing. While oleums of strength below about 45% strength, down to 10% strength or less, can be used in the first stage if desired, optimum operation of the overall process would then dictate the addition of larger quantities of sulfur trioxide in the second stage and thus increase the temperature control problem in the second stage unless the added sulfur trioxide was in very great excess so as to constitute a diluent or liquid reaction medium in which the reaction takes place.

In the first or cold stage of the processes of the invention, the reacting mass is cooled to inhibit the formation of carbon dioxide and hence suppress the production of sulfamic acid in that stage. This is done by maintaining the temperature of the reacting mass below about 50° C., preferably within the range of about 20° to 40° C., and more preferably 25° to 35° C.

As mentioned previously, considerable heat is liberated in the first stage of the processes of the invention and hence the rate at which the urea and oleum reactants can be brought together while still maintaining the required cooling to suppress formation of sulfamic acid is dependent in large measure upon the provisions made in the processing equipment for abstracting heat from the reacting mass.

In the drawing, there is shown a practical method for maintaining the necessary temperature control in the first stage of processes of the invention. According to the method there illustrated, a relatively large body of liquid which has previously been prepared from oleum and urea with cooling is maintained in premix vessel 1, which vessel is equipped with an agitator, not shown, and also is preferably equipped with cooling means. A portion of this body of liquid is continuously being withdrawn and cycled thru external cooler 7 which is designed to be capable of removing all or at least the bulk of the heat liberated in the reaction. This technique is well adapted to maintain the necessary temperature control. It will be apparent to those skilled in the art, however, that other apparatus and techniques can be used for carrying out the first stage or step of the processes of the invention keeping in mind the essential requirement that the cooling capacity be sufficient to suppress the formation of sulfamic acid in that stage at the particular rates at which the oleum and urea reactants are being brought together.

It is also apparent that the separate addition of sulfuric acid and sulfur trioxide can be used in the first stage in lieu of part or all the oleum and that such operation is the equivalent of the use of oleum since oleum is but a solution of sulfur trioxide in sulfuric acid.

Turning now to the second or hot stage of the processes of the invention with particular reference to the preferred operation illustrated in the drawing, it will be seen that there is a pipeline 11 thru which cooled liquid reacting mass from the first stage, after having passed thru cooler 7 and pipelines 8 and 11, flows into reactor 12. In the preferred continuous operation, a portion only of the volume of liquid passing thru cooler 7 passes thru pipe 11 into reactor 12, the major part of that liquid being returned thru pipe 9 to premix vessel 1.

Reactor 12 is equipped with an agitator and cooling means, not shown, with an inlet pipe 13, for the introduction of sulfur trioxide, a vent line 14 for removal of gases, and a transfer or conveyor means 15 for withdrawing particulate solid sulfamic acid from the reactor.

In the second stage of the processes of the invention, the conversion to sulfamic acid is carried out by raising the temperature to effect liberation of carbon dioxide and formation of sulfamic acid. Carbon dioxide liberation starts at about 70° C., and the reaction will of course proceed at higher temperature up to 150° C. However, one can operate the second stage efficiently at a temperature not in excess of about 90° C. Accordingly, in the second stage, the temperature is preferably maintained in the range of about 70° to 90° C. More preferably, the temperature is maintained within the range of 75° to 85° C., with the optimum temperature about 80° C.

It is an essential characteristic of processes of the invention that sulfur trioxide over and above the amount introduced into the processes in the first or cold stage of the processes be introduced into the second or hot stage of the processes of the invention. In order to achieve the full benefits of the improved processes of the invention, the amount of sulfur trioxide introduced at the second stage should constitute at least 10% of the total amount of sulfur trioxide introduced into the process and should be sufficient to bring the total amount of sulfur trioxide introduced in the overall process to at least 30% and preferably to from 30% to 40%, more than the amount stoichiometrically required to react with urea and sulfuric acid to form sulfamic acid. In other words, at least 10% of the $SO_3$ is introduced in the second stage and the total amount of $SO_3$ introduced into the process is at least 1.3 mols and preferably 1.3 to 1.4 mols for each mol of urea. Of course, more than 40% excess sulfur trioxide, up to 100% excess or more, can be used if desired, but then larger sulfur trioxide recovery facilities are required or large sulfur trioxide losses result.

In preferred processes of the invention, the second stage reaction is carried out by bringing together the liquid reaction medium from the first stage and additional sulfur trioxide on the surfaces of a hot body of agitated particulate solid, preferably sulfamic acid previously formed, and controlling the rate of addition of the liquid from the first stage and the added sulfur trioxide so that the mass upon or within which the second stage reaction occurs remains apparently dry and without the presence of any substantially continuous liquid phase. Such technique can be effected by introducing the liquid reaction mass from the first stage and the additional sulfur trioxide thru separate lines into the agitated particulate solid at suitable rates, or alternatively the liquid from the first stage and the sulfur trioxide can be brought together in a single feed line at a point immediately preceding the termination of such feed line in or above the particulate solid mass.

At the temperatures employed in the second stage, sulfamic acid is formed with the liberation of carbon dioxide. Referring again to the embodiment shown in the drawing, there will be seen a method for treatment of effluent gases from the reactor to recover sulfur trioxide and carbon dioxide and for further processing of the sulfamic acid produced in the reactor to obtain a better quality product.

The effluent gases, containing carbon dioxide and sulfur trioxide, are removed thru pipeline 14 and passed countercurrent to sulfuric acid in absorber 16 wherein the sulfur trioxide is absorbed in the sulfuric acid to form stronger sulfuric acid which is withdrawn thru pipeline 17. Carbon dioxide which passes thru the absorber is in part vented thru pipeline 18 and in part cycled by pipeline 19 to degasser 20.

The term "sulfuric acid" is used in the preceding paragraph in a generic sense to include sulfuric acid compositions containing less than 100% $H_2SO_4$, e. g., aqueous solutions, as well as compositions containing an $H_2SO_4$ equivalent of more than 100%, e. g., oleum. Corrosion is minimized by using oleum and preferably 30% oleum as the absorbent liquid fed to absorber 16.

In the degasser, the cycled carbon dioxide is passed countercurrent to sulfamic acid withdrawn from reactor 12. Since the process illustrated is continuous, the sulfamic acid so withdrawn from the reactor contains on its surfaces, or occluded, a significant amount of sulfur trioxide. By passing this sulfamic acid countercurrent to carbon dioxide, much to substantially all of the sulfur trioxide can be removed, the amount removed depending largely, of course, upon the design and operation of the degasser apparatus. The degasser can be of any type of equipment designed for commingling pulverulent solids and gases in countercurrent flow. A ribbon or screw-type conveyor can be used for this purpose for example. Heat can be supplied to the degasser if desired to aid in the $SO_3$ removal step. Preferably the sulfamic acid in the degasser is maintained at a temperature of 45° C.–95° C., and more prefarably 80° C.–95° C.

The effluent gases from the degasser are returned thru pipeline 21 to absorber 16 for removal of sulfur trioxide therefrom. Product sulfamic acid is withdrawn from the degasser by conveyor means 22.

While the drawing illustrates a preferred continuous method for carrying out the two-stage, split $SO_3$ addition processes of the invention, it will be apparent to those skilled in the art that the practice of the invention is not necessarily limited to such a continuous operation, nor necessarily to the type and arrangement of equipment disclosed in the drawing.

The invention is further illustrated by the following detailed examples in addition to the examples given above.

Example 1

810 parts by weight of urea was added at a rate of about 6¾ parts by weight per minute to 2400 parts by weight of about 45% oleum with agitation while maintaining the temperature of the reacting mass at 25 to 35° C. The reacting mass remained liquid throughout this operation, gradually increasing in viscosity.

The viscous liquid obtained as described above was fed gradually along with liquid sulfur trioxide into an agitated body of solid pulverulent sulfamic acid. 0.126 part by weight of sulfur trioxide was so added for each part by weight of the viscous liquid. The total amount of sulfur trioxide so added amounted to 0.375 mol per mol of urea employed in the first stage described above. The temperature of the reacting mass was maintained at 80° C.±3° C.

The product resulting from the above operation was found to contain 94.11% sulfamic acid. The sulfamic acid content of this material was raised to 95.67% by agitating the material at 90° C. in the presence of carbon dioxide.

Example 2

In the process of this example, the first stage of the process was carried out as described in Example 1. In the second stage, liquid sulfur trioxide was brought together with the viscous liquid from the first stage in proportions of 0.336 part by weight for each part of the viscous liquid, and on a molar basis amounting to one mol of sulfur trioxide for each mol of urea. The temperature of the reacting mass was maintained at 80° C.±3° C.

The product analysis was 93.18% as sulfamic acid, and this was raised to 95.40% sulfamic acid by agitating the product at 90° C. with carbon dioxide.

Example 3

Starting with empty equipment, as illustrated in the drawing, there is charged into premix tank 1 3,000 parts by weight of oleum of 48% strength. The agitator in the premix tank, not shown, and pump 5 are started with care being taken to assure that the temperature of the coolant in cooler 7 is above 34° C. so that the 48% oleum does not solidify. Gradual addition of urea to the premix tank is then started. The rate of addition of the urea is so correlated to the cooling capacity of the equipment as to maintain a temperature in the premix mass of 35° C. to 40° C. As the urea is added, the freezing point of the oleum drops rapidly. Thus as soon as urea addition is started, the temperature in the cooler can be dropped and the rate of addition of urea increased accordingly. A total of 956 parts by weight of urea are added in this operation of forming an initial premix liquid.

The agitator in reactor 12 is started and the reactor is charged to about 10% of its capacity with approximately 1500 parts by weight of dry crude sulfamic acid of previous manufacture and the sulfamic acid is heated to 80° C.

Simultaneous addition of urea and 48% oleum is then started thru lines 2 and 3 respectively to the premix liquid in tank 1. The urea and 48% oleum are added in a weight ratio of 3.14 parts of oleum for each part of urea to provide a molar ratio of one mol of urea to one mol of sulfuric acid to 1.13 mol sulfur trioxide.

The simultaneous addition of premix liquid thru pipeline 11 and sulfur trioxide thru pipeline 13 is started to reactor 12. Sulfur trioxide is added at the rate of 0.22 mol for each mol of urea being added to the premix tank thus raising the total quantity of sulfur trioxide introduced into the operation to 1.35 mol for each mol of urea. The feed rates of the urea and 48% oleum to premix tank 1 and of the premix liquid and liquid sulfur trioxide to reactor 12 are continuous and are correlated with the coolant to maintain both constant volume of the reacting masses and constant temperature. The temperature of the premix liquid in premix tank 1 is maintained in the range of 35° C. to 45° C. and preferably at 40° C. The reacting mass in reactor 12 is maintained within the range of 75° C. to 85° C. and for the most part at about 80° C.±1° C.

In the sulfamic acid forming reaction which takes place in reactor 12, one mol of carbon dioxide is liberated for each mol of sulfamic acid formed. The off-gas from sulfur trioxide and small quantities of suspended sulfamic acid dust is removed thru pipeline 14 and passed countercurrent to 30% oleum in absorber 16 to recover the sulfur trioxide and sulfamic acid in the oleum. The gas withdrawn from absorber 16 thru lines 18 and 19 is essentially carbon dioxide.

The sulfamic acid product continuously discharged from reactor 12 is a granular product having an average sulfamic acid content of about 94% by weight.

The 94% sulfamic acid product discharged from reactor 12 is improved in quality by subjecting it to a further treatment in degasser 20, a closed vessel equipped with an agitator wherein the sulfamic acid is agitated while being contacted with a countercurrent stream of carbon dioxide supplied thru pipeline 19 from absorber 16. The amount of sulfamic acid in degasser 20 is maintained at about constant volume and the average retention time of sulfamic acid in the degasser is 90 minutes. The average temperature of the sulfamic acid in the degasser is maintained at about 80° C.

Carbon dioxide is cycled from absorber 16 thru degasser 20 in amount required to maintain a partial pressure of sulfur trioxide in the effluent gases from degasser 21 of about 40 to 45 mm. Hg. The effluent gases are passed thru line 21 to the absorber to recover sulfur trioxide therefrom.

The product sulfamic acid which is continuously discharged from degasser 20 is a granular, free-flowing solid having an average strength of over 96.0% sulfamic acid.

The foregoing detailed description has been given for clearness of understanding only and no unnecessary limitations are to be understood therefrom. The invention is not limited to the exact details shown and described for obvious modifications will appear to those skilled in the art.

I claim:

1. A process for the manufacture of sulfamic acid which comprises substantially continuously bringing together as reactants urea and oleum of strength up to about 51% oleum in proportions of substantially one mol of sulfuric acid for each mol of urea to form a liquid in a body of liquid which has been similarly formed from said reactants in said proportions while cooling to suppress formation of sulfamic acid, substantially continuously withdrawing a portion of said liquid, adding sulfur trioxide and agitating in contact with a body of solid pulverulent sulfamic acid at a temperature above about 70° C. to effect liberation of carbon dioxide and formation of sulfamic acid, the liquid and solid sulfamic acid being brought together in proportions so that the resulting mix remains apparently dry and without the presence of any substantially continuous liquid phase, said sulfur trioxide being added to provide at least 10% of the total amount of sulfur trioxide introduced into the process and to bring said total amount to at least 30% more than the amount stoichiometrically required to react with urea and sulfuric acid to form sulfamic acid.

2. A process for the manufacture of sulfamic acid which comprises substantially continuously bringing together as reactants urea and oleum of strength of about 45% to 48% oleum in proportions of substantially one mol of sulfuric acid for each mol of urea to form a liquid in a body of liquid which has been similarly formed from said reactants in said proportions while maintaining a temperature of about 20° to 40° C., substantially continuously withdrawing a portion of said liquid, adding sulfur trioxide and agitating in contact with a body of solid pulverulent sulfamic acid maintained at a temperature above about 70° C. to effect liberation of carbon dioxide and formation of sulfamic acid, the liquid and solid sulfamic acid being brought together in proportions so that the resulting mix remains apparently dry and without the presence of any substantially continuous liquid phase, said sulfur trioxide being added to bring the total amount of sulfur trioxide introduced to from about 30% to 40% more than the amount stoichiometrically required to react with urea and sulfuric acid to form sulfamic acid.

3. A two-stage process for the manufacture of sulfamic acid which comprises in a first stage substantially continuously bringing together as reactants urea and oleum of strength of about 45% to 48% oleum in proportions of substantially one mol of sulfuric acid for each mol of urea to form a liquid in a body of liquid which has been similarly formed from said reactants in said proportions while maintaining a temperature of about 25° to 35° C., substantially continuously withdrawing a portion of said liquid, and in a second stage adding sulfur trioxide to the withdrawn portion and agitating it in contact with an agitated body of solid, particulate sulfamic acid maintained at a temperature of about 70° to 90° C. to effect liberation of carbon dioxide and formation of sulfamic acid, the liquid and solid sulfamic acid being brought together in proportions so that the resulting mix remains apparently dry and without the presence of any substantially continuous liquid phase, and the amount of sulfur trioxide added in the second stage being sufficient to bring the total amount of sulfur trioxide introduced, including that introduced as oleum in the first stage, to from about 30% to 40% more than the amount stoichiometrically required to react with the urea originally present, according to the equation:

$$CO(NH_2)_2 + H_2SO_4 + SO_3 \rightarrow 2NH_2SO_3H + CO_2$$

References Cited in the file of this patent

UNITED STATES PATENTS

| 2,408,823 | Tauch | Oct. 8, 1946 |
| 2,409,572 | Leonard | Oct. 15, 1946 |
| 2,436,658 | McQuaid | Feb. 24, 1948 |

FOREIGN PATENTS

| 460,262 | Canada | Oct. 11, 1949 |
| 589,662 | Great Britain | June 26, 1947 |